United States Patent
Dorini

(10) Patent No.: US 12,491,683 B2
(45) Date of Patent: *Dec. 9, 2025

(54) METHOD OF OPERATION FOR AN APPARATUS FOR LAYER-BY-LAYER MANUFACTURE OF 3D OBJECTS

(71) Applicant: Stratasys Powder Production Ltd., London (GB)

(72) Inventor: Gianluca Dorini, London (GB)

(73) Assignee: Stratasys Powder Production Ltd., Nottingham (GB)

( * ) Notice: Subject to any disclaimer, the term of this patent is extended or adjusted under 35 U.S.C. 154(b) by 54 days.

This patent is subject to a terminal disclaimer.

(21) Appl. No.: 17/943,904

(22) Filed: Sep. 13, 2022

(65) Prior Publication Data

US 2023/0079559 A1 Mar. 16, 2023

(30) Foreign Application Priority Data

Sep. 13, 2021 (GB) ...................................... 2113015

(51) Int. Cl.
*B29C 64/393* (2017.01)
*B29C 64/153* (2017.01)
(Continued)

(52) U.S. Cl.
CPC .......... *B29C 64/393* (2017.08); *B29C 64/153* (2017.08); *B33Y 10/00* (2014.12);
(Continued)

(58) Field of Classification Search
CPC ................................................... B29C 64/00
See application file for complete search history.

(56) References Cited

U.S. PATENT DOCUMENTS

2016/0096325 A1* 4/2016 Araie .................... B22F 10/366
264/497
2016/0368055 A1* 12/2016 Swaminathan ........ B23K 26/16
(Continued)

FOREIGN PATENT DOCUMENTS

| EP | 3539752 A1 | 9/2019 |
|---|---|---|
| GB | 2493398 A | 2/2013 |

(Continued)

*Primary Examiner* — Susan D Leong
*Assistant Examiner* — Tiffany Yu Huang
(74) *Attorney, Agent, or Firm* — Honigman LLP; Eric J. Sosenko; Jonathan P. O'Brien

(57) ABSTRACT

A method of manufacturing 3D objects in an apparatus having a thermal sensor, a stationary heat source and one or more further heat sources. The method includes a warm up and a build process; each processing multiple layers by a layer cycle. The layer cycles include (a) providing build bed surface of particulate material; (b) heating the surface using the stationary or a first moving heat source; (b1) depositing absorption modifier (absorber) over one or more layer-specific regions and/or depositing absorption modifier (inhibitor) over a surrounding area; (c) heating the surface by the first or a second moving heat source; and (d) measuring the temperature of the surface after (a) and/or (b) and/or (c). During one or more of (a) to (c), heating the surface to a target temperature, such that (c) causes the layer-specific region of each layer to melt and form a portion of the 3D object.

18 Claims, 7 Drawing Sheets

(51) Int. Cl.
  *B33Y 10/00* (2015.01)
  *B33Y 40/10* (2020.01)
  *B33Y 50/02* (2015.01)
  *G01J 5/10* (2006.01)

(52) U.S. Cl.
  CPC .............. *B33Y 40/10* (2020.01); *B33Y 50/02* (2014.12); *G01J 5/10* (2013.01); *G01J 2005/106* (2013.01)

(56) References Cited

U.S. PATENT DOCUMENTS

| | | | |
|---|---|---|---|
| 2018/0186074 A1* | 7/2018 | Hull | B22F 12/41 |
| 2019/0143407 A1* | 5/2019 | Imoto | B33Y 30/00 |
| | | | 419/54 |
| 2020/0398482 A1* | 12/2020 | Tjellesen | B29C 64/209 |
| 2021/0362429 A1* | 11/2021 | Barnes | B33Y 10/00 |
| 2021/0387419 A1* | 12/2021 | Patel | B33Y 10/00 |

FOREIGN PATENT DOCUMENTS

| | | |
|---|---|---|
| WO | 2020/115488 A1 | 6/2020 |
| WO | 2020/245600 A1 | 12/2020 |

* cited by examiner

METHOD OF OPERATION FOR AN APPARATUS FOR LAYER-BY-LAYER MANUFACTURE OF 3D OBJECTS

FIELD OF THE INVENTION

The present disclosure relates to a method of operation for an apparatus for the manufacture of three-dimensional (3D) objects using a thermal sensor and two or more heat sources to control the thermal cycle of the process. The method might find particular benefit in a powder bed fusion apparatus in which 3D objects are built layer-by-layer from particulate material. A controller and an apparatus for applying the method are also disclosed.

BACKGROUND

In applications for forming 3D objects from particulate material, such as powder bed fusion applications like "print and sinter" and laser sintering, an object is formed layer-by-layer from particulate material spread in successive layers across a support. Each successive layer of the object is melted or partially melted to fuse or sinter the particulate material over defined regions and in so doing to consolidate it, in order to form a cross section of the 3D object. In the context of particulate polymer materials, for example, the process of melting achieves fusion of particles. Typically, several heating devices are operated in a print and sinter apparatus to heat the particulate material during each layer cycle. For example, one or more infrared bar heaters may be moved across each layer to heat the layer surface (the build bed surface) sufficiently to achieve fusion over selectively modified regions. The thermal processes of the layer cycle require accurate control to achieve high-quality, uniform objects with well-defined properties in a reliable, reproducible manner.

At the start of a build process of an object, the apparatus may carry out a warm up process, to ensure that a steady thermal state has been reached that provides a stable environment for the build process. Such a warm up process typically takes a significant period of time of the overall process of operation to build an object, and may comprise distributing and heating a plurality of blank layers. Blank layers are layers without regions over which absorption modifier has been deposited and that therefore do not comprise fused regions. During such a warm up process, various calibration routines may be carried out. For example, typically the apparatus comprises a thermal sensor, such as a pyrometer or thermal camera, that is used to detect the temperature of the layer surface, for example as part of feedback control in the operation of the one or more heating devices. One of the calibration routines may thus be for the thermal sensor. In addition, the various heating devices may be calibrated. The present invention provides improvements to the warm up process.

SUMMARY

The following disclosure describes, in one aspect, a method of operation for an apparatus for the layer by layer manufacture of 3D objects from particulate material, the apparatus comprising a thermal sensor, a stationary heat source positioned above a build bed surface of each layer, and one or more further heat sources; wherein the method comprises a warm up process followed by a build process, and each process comprises processing a plurality of layers, wherein each layer is processed by a layer cycle comprising the steps (a) to (d) of:

(a) distributing a layer of particulate material by moving a distributor over a build area, the layer providing the build bed surface of the build area;
(b) heating the build bed surface using the stationary heat source, or a first heat source by moving the first heat source over the build bed surface while operating the first heat source;
(c) heating the build bed surface by moving the first heat source, or a second heat source, over the build bed surface while operating it; and
(d) measuring the temperature of the build bed surface at least once after one or more of steps (a) to (c), using the thermal sensor;

wherein the layer cycle comprises, during one or more of steps (a) to (c), heating the build bed surface with the stationary heat source to a target layer temperature between the solidification temperature and the melting temperature of the particulate material; and wherein the layer cycle of the build process further comprises, between the steps (b) and (c) of heating, a step of (b2) depositing absorption modifier in the form of radiation absorber over one or more layer-specific regions; and/or depositing absorption modifier in the form of absorption inhibitor over a surrounding area surrounding the one or more layer-specific regions, such that the step (c) of heating causes the layer-specific region of each build layer to melt so as to form a cross section of one or more 3D objects.

BRIEF DESCRIPTION OF THE DRAWINGS

Reference is now directed to the drawings, in which.

In the drawings, like elements are indicated by like reference numerals throughout.

DETAILED DESCRIPTION

Figure 1A:
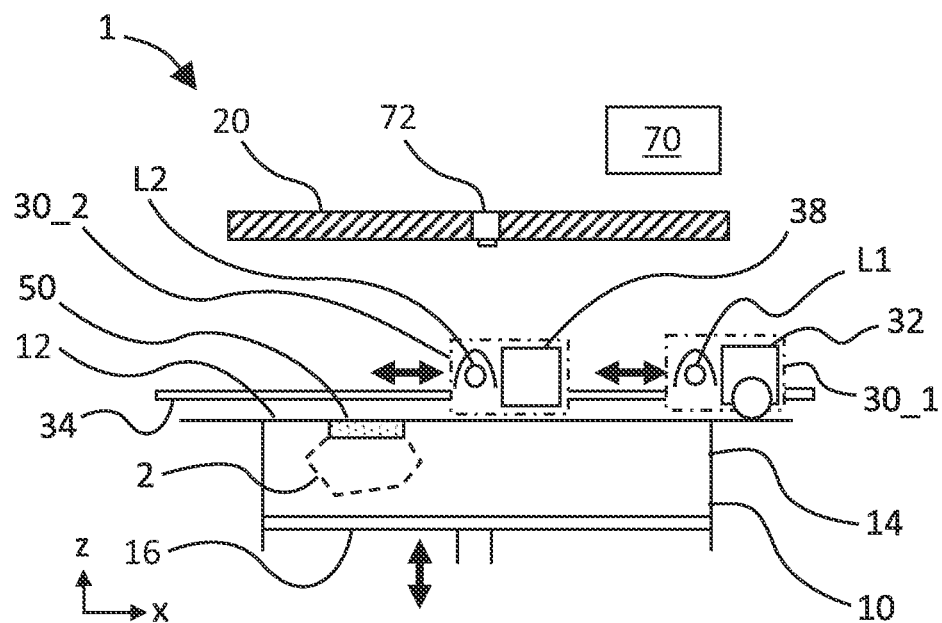
FIG. 1A is a schematic cross-section of a side view of an apparatus configured to apply the method of the invention.

FIG. 1A schematically illustrates a detail of a cross section of a powder bed fusion type apparatus 1, as an example of a 3D printing apparatus configured to carry out the method and its variants that will now be described with reference to FIGS. 1A to 8.

In a typical process for the layer-by-layer formation of a 3D object from particulate material, successive layers of particulate material are distributed, each to form a build bed surface 12 which is processed to form successive cross-sections of an object 2. In this context, the reference to the 'build bed surface' is to the surface of the top-most layer of particulate material. In other words, each newly distributed layer forms a new build bed surface 12 that is the build bed surface of the layer to be processed in that particular layer cycle.

Figure 1B:
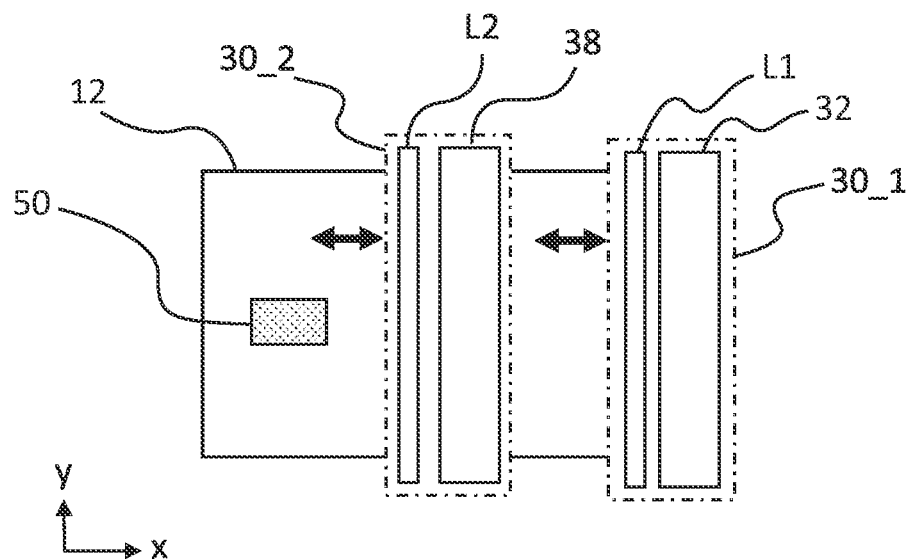
FIG. 1B is a schematic plan view of the build bed surface of FIG. 1A.

As indicated in FIG. 1A, the apparatus 1 comprises a distribution module 32 for distributing each layer of particulate material across a build bed 14, a deposition module 38 for selectively depositing absorption modifier over a layer-specific region 50 defined within the build bed surface 12, and a heating module comprising a heat source L1 to heat the layer-specific region 50 following deposition of the absorption modifier. The layer-specific region 50 may represent a cross section of an object 2, or a test region of a calibration part in a calibration process. The term "layer-specific region" indicates that its position, shape and pattern will be layer dependent within a specific process or routine, and might vary between different processes and routines. The modules may be provided on one or more carriages moveable across the layer. In the example of FIG. 1A, an implementation with two carriages 30_1 and 30_2 is shown. The carriages are arranged on one or more rails 34 that allow them to be moved back and forth above the build bed surface 12 along a first direction along x and along a second direction opposite the first direction. The first carriage 30_1 in this variant comprises the distribution module 32, for example comprising a roller as shown. The second carriage 30_2 comprises the deposition module 38, such as a droplet deposition module configured to deposit the absorption modifier in the form of fluid droplets. Mounted behind the deposition module 38, with respect to the first direction, is the heat source L2. Where the distribution module is a roller, a fresh portion of powder is supplied to the surface to the right of the roller and to the left of the build bed surface 12, and the portion is spread over the build bed 14 as the roller is moved over the build bed surface 12. Alternatively, the distribution module may contain particulate material that it gradually releases and spreads over the build bed surface 12 as it moves along the first direction. The build bed 14 is contained between walls 10 and supported on a platform 16, which is arranged to move vertically within the container walls 10 to lower or raise the build bed surface 12; for example, by a piston located beneath the platform 16. The apparatus further comprises, without specifically showing, a reservoir to supply particulate material to a dosing module that doses an amount of fresh particulate material to be distributed across the build bed 14, thus forming a new build bed surface 12. FIG. 1B shows a plan view of the build bed surface 12 of FIG. 1A with the layer-specific region 50 and the carriages 30_1 and 30_2 with the distribution, deposition and heating modules spanning the width of the build bed surface 12 (along y). As indicated before, each carriage 30_1, 30_2 is moveable back and forth along the x-axis, which herein is also referred to as the length of the build bed surface 12, the length being perpendicular to the width, however reference to length and width is not intended to indicate relative extent of the two directions but to merely help reference directions of the process.

The absorption modifier may be radiation absorber deposited over the layer-specific region 50. Selectivity of preferentially heating the layer-specific region 50 versus the surrounding area is achieved by providing a heat source L2 with a spectrum of radiation that is absorbed to a higher degree by the radiation absorber compared to the surrounding area. If the combination of absorber and power input to the heat source L2 (causing a certain energy input to the region 50) is sufficient, the particulate material of region 50 melts, or sinters, to fuse or consolidate and form a region of consolidated particulate material. Thus, during a build process of an object, the radiation absorber may be deposited over layer-specific regions 50 of the build bed surface 12 so as to define the cross sections of the object 2 over successive layers.

In a typical build process, the build bed surface 12 is maintained at or close to a predefined target layer temperature T3(target) that is below the melting temperature of the particulate material and above the solidification temperature. This means it may for example be maintained within a temperature range of 10-20° C. below the melting temperature. The fresh particulate material is generally at a significantly lower temperature, such that the distributed layer has a significant cooling effect on the build bed surface 12 of the previous layer. Such large temperature differentials can cause warping of the fused parts, and it is desirable to increase the temperature of the distributed layer to, or closer to, the target layer temperature T3(target) of the build bed surface 12 without unnecessary delay. Therefore, a further heat source, such as a heat source L2, as indicated in the apparatus 1 of FIGS. 1A and 1B, may be provided behind the distribution module 32 on the second carriage 30_2 to immediately preheat the freshly distributed particulate material. The two heat sources will be referred to with respect to the order in which they heat each layer; thus the heat source following the distributor is referred to as "first heat source", L1, and the heat source following the distribution module, and typically used to fuse the particulate material of the layer specific region during a build process, is referred to as "second heat source", L2. The wavelength spectrum of the first heat source L1 is such that, over a preheat period of time, it is capable of sufficiently preheating the layer-specific region 50 and the surrounding area, both being void of radiation absorber, up to or towards the target layer temperature T3(target). The target layer temperature T3(target) may be achieved in combination with, for example, operating an overhead heater 20 provided stationary above the build bed surface 12 as shown in FIG. 1. As for the second heat source L2, the period of time over which the second heat source L2 heats the layer specific region 50 may be determined by the speed at which the first heat source L1 traverses, and transfers heat to, the layer-specific region 50.

To control the temperature of the build bed surface 12 during the layer cycle, the build bed surface 12 may generally be monitored by a thermal sensor 72 provided above the build bed surface 12. The thermal sensor 72 may be centrally mounted in the form of a thermal camera or a pyrometer within the area of the overhead heater 20, or it may be provided on one or both of the carriages 301_, 30_2 in the form of a thermal line scan sensor. The measurements from the thermal sensor 72 may be used to apply feedback control, as controlled by controller 70 of the apparatus, for example, to the one or more of the heating devices involved in heating the build bed surface 12, for example to the overhead heater 20. When the overhead heater 20 is adequately controlled, local differences in temperature across the build bed surface 12 may be reduced, which improves object quality, for example mechanical and visual properties. Before starting a build process, it is desirable that the apparatus reaches a stable thermal state to allow the manufacture of objects of high quality by having control over their accuracy and performance. It has been found that conventional warm up process are inadequate to ensure stability between the transition of the warm up process and the build process.

Figure 2:
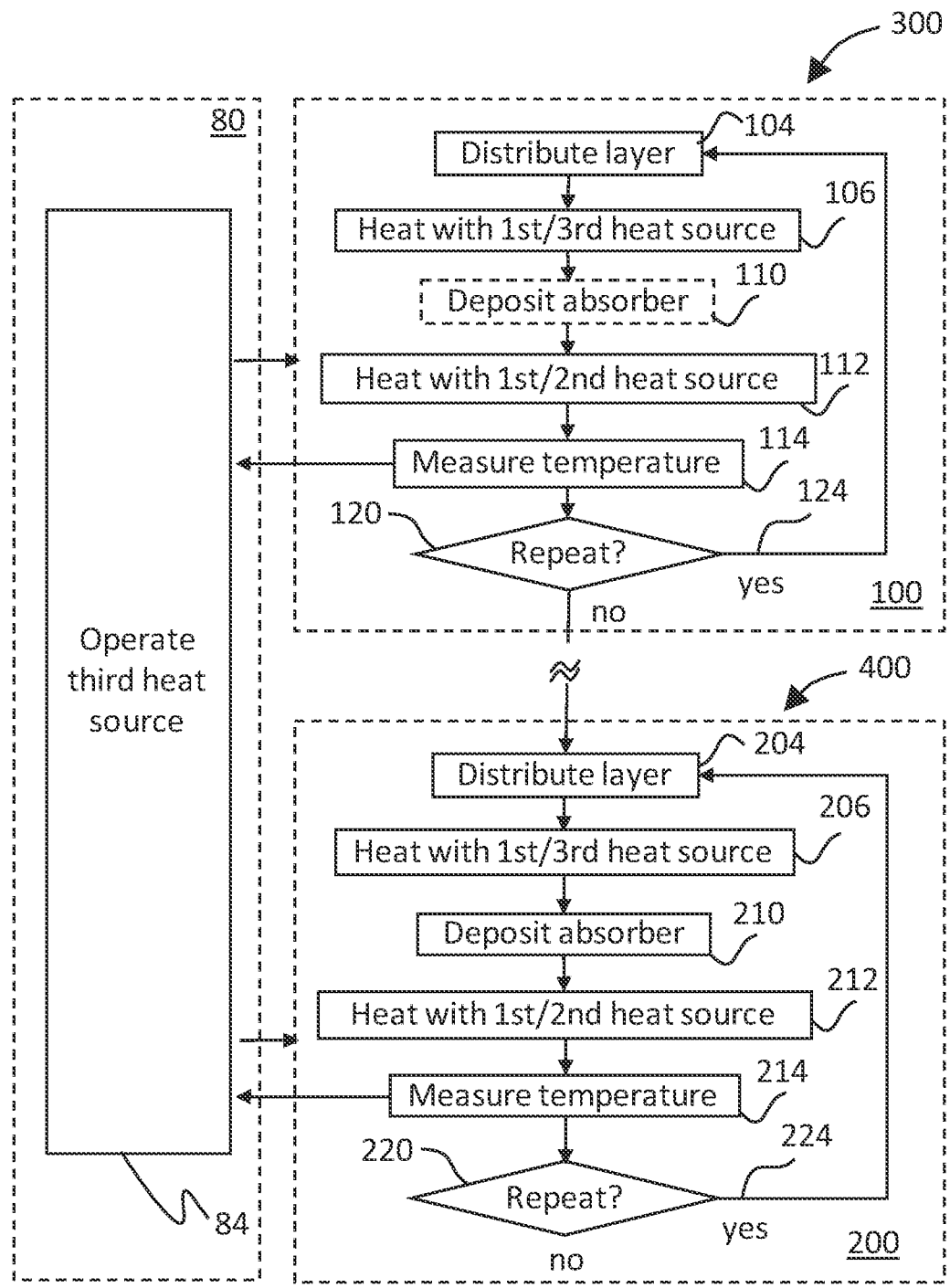
FIG. 2 is a flow chart of the method of the invention.
Figure 3:
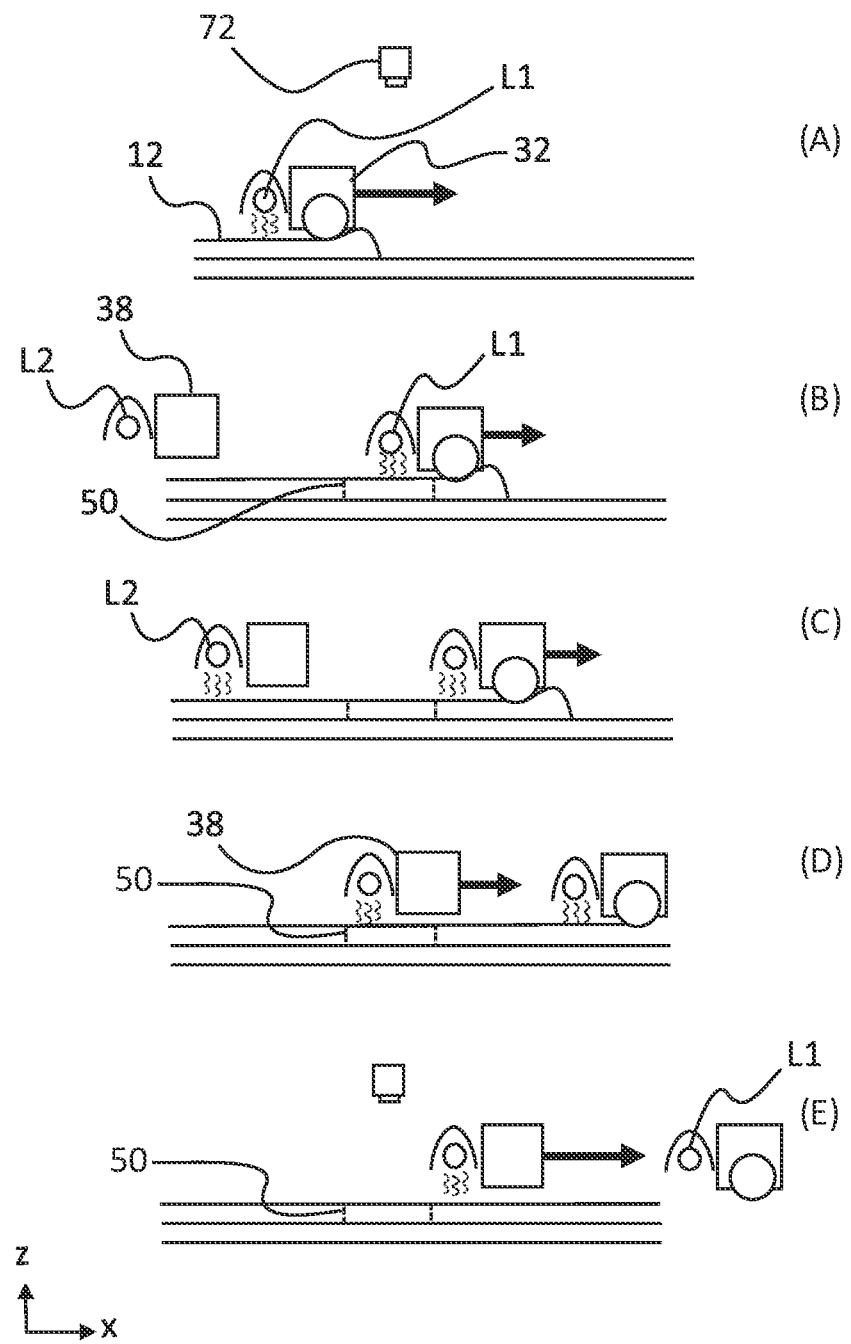
FIG. 3 illustrates an implementation of the flow chart of FIG. 2 with the modules of FIG. 2.

The inventor has discovered that an improved method of operation for an apparatus for the layer-by-layer manufacture of a 3D object from particulate material, wherein the apparatus comprises a thermal sensor 72, a stationary heat source positioned above a build bed surface of each layer, and one or more further heat sources L1, L2, may be provided, comprising a warm up process 300 having substantially the same layer cycle as a subsequent build process 400 for the manufacture of one or more objects. With reference to FIG. 2, the warm up process 300 and the build process 400 comprise the steps of respective blocks 100 and 200 for processing a plurality of layers each, wherein each layer is processed by the layer cycle steps (a) to (b) of:

(a) distributing, at block 104 (as at block 204), a layer of particulate material by moving a distributor 32 over a build area, the layer providing a build bed surface 12 of the build area;

(b) heating, at block 106 (as at block 206), the build bed surface 12, for example by moving a first heat source L1 over the build bed surface 12 while operating the first heat source L1 at a first input power profile, or by using the stationary heat source 20;

(c) heating, at block 112 (as at block 212), the build bed surface 12 by moving the first heat source L1, or a second heat source L2, over the build bed surface 12 while operating it at a second input power profile; and (d) measuring, at block 114 (as at block 214), the temperature of the build bed surface 12 at least once after one or more of steps (a) to (c), using the thermal sensor 72, wherein the layer cycle comprises, during at least one of the layer cycle steps, heating at a common block 84, the build bed surface 12 to substantially a target layer temperature T3(target) with the stationary (third) heat source 20. The further (third) heat source may be fixedly positioned above the build bed surface 12.

The layer cycle steps (a) to (b) are repeated until the respective plurality of layers of the warm up process and the built process is complete. After completion of the warm up process 300, the method of operation may proceed to the build process 400, wherein the build process preferably has substantially the same layer cycle as the warm up process (as indicated by the reference numerals of the blocks of the build process merely being advanced by 100), and further comprises, between the steps (b) and (c) of heating, a step (b2) of one or both of depositing absorption modifier in the form of radiation absorber over one or more layer-specific regions; and depositing absorption modifier in the form of absorption inhibitor over a surrounding area surrounding the one or more regions, wherein the step (c) of heating causes the particulate material within the layer-specific region of the build layer to melt so as to form a cross section of one or more 3D objects; i.e. the combination of the absorption modifier and the second input power profile is such that melting the particulate material within the layer-specific region is achieved at step (c). By applying substantially the same layer cycle to both the warm up process 300 and the build process 400, and using the same heat sources in the same or in a substantially similar way, thermal consistency between the warm up process and the build process may be provided, and thermal stability may be maintained without interruption of the thermal cycle when progressing from the warm up to build layer process, thus providing improved consistency and quality in the built 3D objects. Specifically, the first heat source L1 may be used to heat each newly distributed layer at blocks 106 and 206 of the warm up process 300 and build process 400. Afterwards, regardless of whether absorption modifier has been deposited or not, the first heat source L1 is passed again over the build bed surface, or a second heat source L2 is passed over the build bed surface, to heat the layer both at block 112 of the warm up process and at block 212 of the build process. This further ensures thermal consistency between warm up process 300 and the build process 400.

Figure 8:
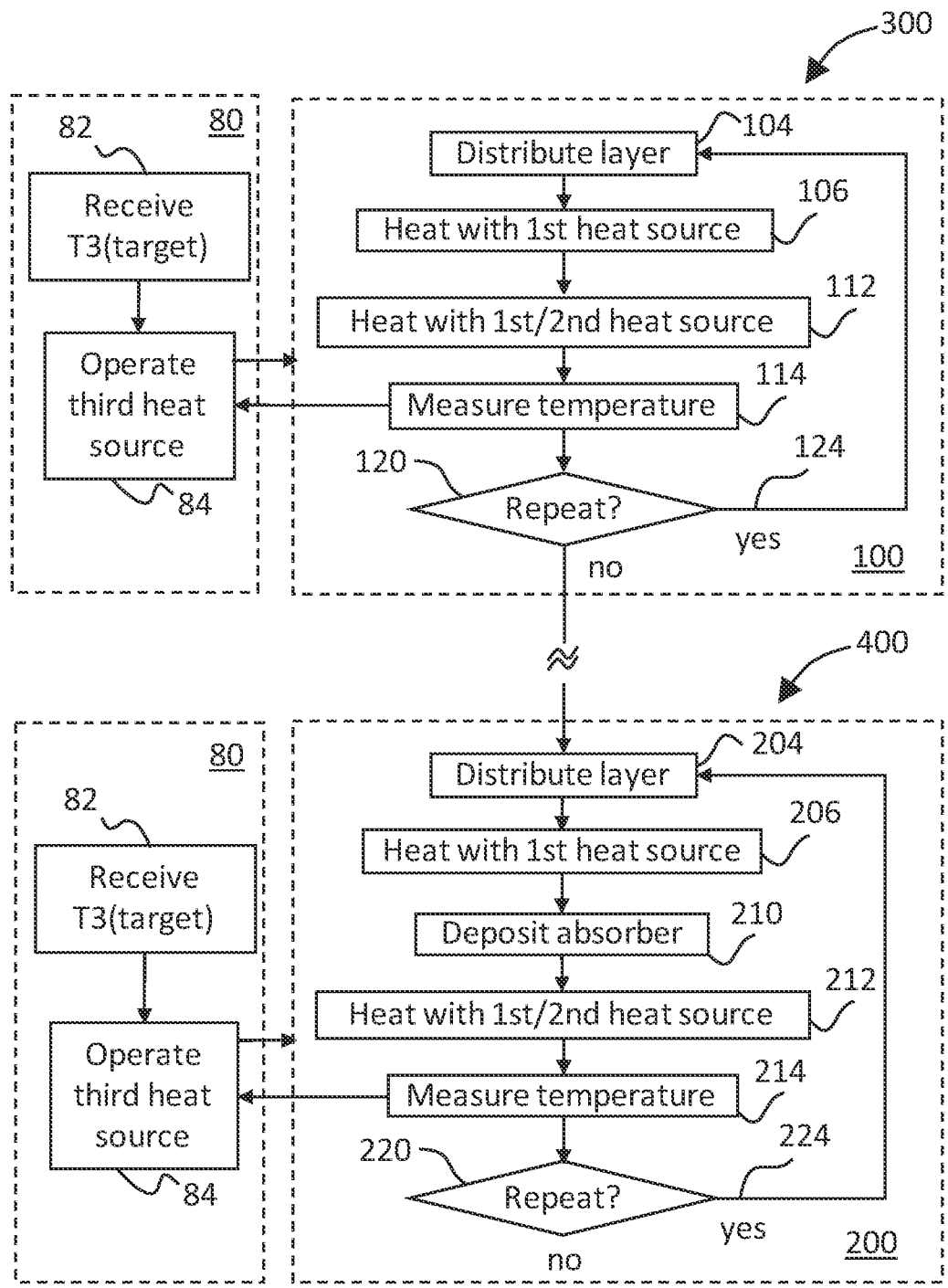
FIG. 8 is a variant of FIG. 2.

The stationary heat source 20 may be operated in response to the one or more temperature measurements measured at step (d) and based on the target layer temperature (T3 (target)). Preferably, the stationary heat source 20 is operated continuously throughout the layer cycle 100 of the warm up process 300, and preferably also during the layer cycle 200 of the build process 400, and wherein the step (b) of heating the build bed surface 12 is preferably carried out by the first heat source L1 in combination with the stationary heat source 20 (overhead heater), so as to preheat the build bed surface 12 to a preheat temperature between the solidification temperature and the melting temperature of the particulate material. In some variants, the temperature may be measured intermittently throughout the layer cycle, and an effective thermal map of the temperature of the build bed surface 12 after each step may be determined. An average temperature of one or more regions of the build bed surface 12 may be determined from the thermal map. Similarly, the block 84 of heating with the third heat source 20 may not be applied sequentially as exemplified, but may instead be applied at one or more of the steps (a) to (c), or it may be applied continuously throughout the layer cycle of the warm up process and the build process. The third heat source 20 may be operated in response to one or more temperatures determined from the one or more temperature measurements in step (d) and with respect to the target layer temperature T3(target), wherein the target layer temperature T3(target) is lower than the melting temperature of the particulate material, and typically higher than the solidification temperature org lass transition temperature of the particulate material. The target layer temperature T3(target) may for example be 10-20° C. below the melting point of the particulate material so as to keep temperature differentials between fused and unfused areas small. For example, the thermal sensor 72 may measure the temperature of the build bed surface 12 at a plurality of locations, and the measured temperature may be an average temperature determined over the plurality of locations. The third heat source 20 may be thus operated based on an average measured temperature and the target temperature T3(target). In some variants, the average measured temperature may be determined based on temperature measurements of the surrounding area surrounding the one or more layer-specific regions 50 after one or more of the steps of distributing and heating the layer/build bed surface 12. The target temperature T3(target) may be predefined by the user and received by a controller 70 used to operate the third heat source 20. This is illustrated in FIG. 8, which is a variant of FIG. 2, by including a block 82 of a general block 80 of heating by the third heat source. At block 82, the target layer temperature may be received based on which, at block 84, the third heat source is operated. In FIG. 8, block 82 of receiving the target layer temperature of the build process 400 may be redundant since preferably the same target layer temperature T3(target) is applied for both the warm up process 300 and the build process 400. Block 84 may thus be identical and as indicated in FIG. 2.

For further improvement in thermal consistency and uniformity of the build bed surface 12, in a preferred variant of the method, the steps (a) of distributing, (b) of heating at the first temperature profile and (c) of heating at the second temperature profile are carried out in a same, first, direction for each of the plurality of layers of the warm up process and the build process 400. This ensures that each location of the build bed surface experiences the same thermal cycle, with the same timings, as any other location of the build bed surface 12.

The temperature measurements measured at block 114 may be temperature profiles of some, or substantially all, of the build bed surface 12. The step of heating with the third heat source 20 based on the temperature measurements and in combination with the first, or first and second, heat source supports a consistent and stable thermal process. For example, the third heat source 20 may emit radiation that is readily absorbed by the particulate material in absence of radiation absorber, and may therefore assist in maintaining the newly distributed layer at the target layer temperature T3(target). Meanwhile the first heat source L1 at step (b) may assist in returning the freshly distributed layer towards, or to, the target layer temperature T3(target) to avoid warp in the previously fused/melted layer-specific region.

The "input power profiles" referred to herein used to operate the heat source(s) at block 106 and 112 during the warm up process 300 (or during the build process 400 at block 206 and 212) indicate a power input applied along at least one dimension of the build bed surface 12, for example in the direction of movement of the first and/or second heat source L1, L2. The input power profile may be a constant input power profile, for example a constant duty cycle, such that the energy of heating is constant along the first direction over the build bed surface 12. In variants of the method, the input power profile of at least one of the heat sources may vary along the direction of movement, i.e. it may vary with distance over the build bed surface 12. For example in variants of the method in which the steps (a), (b) and (c) at blocks 104, 106, 112 of the warm up process 300 and at blocks 204, 206, 212 of the build process 400 are carried out in a first direction for each of the plurality of layers, the input power profile may vary linearly or non-linearly from one side of the build bed surface to the other along the first direction during the step of heating.

The third heat source 20 (e.g. the overhead heater positioned above the build bed surface 12 as shown in FIG. 1A), may comprise an array, or a plurality, of individually addressable heater elements configured to provide individual, or zonal, thermal compensation over corresponding regions on the build bed 14. The thermal sensor 72 may be a thermal camera with a high-resolution pixel array of individual sensor pixels configured to monitor the build bed surface 12 of individual sensor pixels, and the step of measuring the temperature at block 114 and 214 of the layer cycle may comprise determining a zonal temperature for each of a plurality of zones of the build bed surface 12 as measured by a subset of the sensor pixels; and determining a zonal temperature difference between each zonal temperature and the target layer temperature T3(target). In this case, the step of heating each layer by the third heat source 20 at block 84 may comprise heating each zone by operating one or more corresponding heater elements of the array of individually operable heater elements in response to the measurements of the one or more groups of sensor pixels and the determined zonal temperature difference. It should be noted that the temperatures measured by a subset or group of pixels of the thermal sensor 72 may be used to calculate an average temperature for a corresponding region or zone, and thus for each of a plurality of regions or zones comprised within the build bed surface 12. For each zone, a new duty cycle may be determined for the corresponding heater element based on the determined average temperature of that zone and with respect to the target layer temperature T3(target), so that the subsequent average temperature measured for that zone is closer to, or substantially is at, the target layer temperature T3(target). In this case the third heat source 20 may be operated to maintain the target layer temperature T3(target) and to even out zonal temperature variations measured across the build bed surface 12, thus preventing distortions in the object made during the build process 400 due to local temperature variations of the build bed surface 12. As above, the measurements at step (d) based on which the third heat source is operated may be measurements of the surrounding area of the layer-specific region 50.

In variants, and depending on the type of heat source and its mode of operation, it may be preferable to operate the third heat source 20, or at least one of the heater elements of the third heat source 20, continuously throughout the duration of time of the layer cycle. This may comprise operating at least one of the heater elements continuously. The third heat source may be operated continuously in this way throughout each step of the layer cycle, and for the duration of the warm up process and the build process. Continuous operation may comprise operating each heater element of the third heat source 20 at a respective constant or variable duty cycle.

During the layer cycle, one or more temperature measurements at block 14 may be made by the thermal sensor 72 of the temperature of or within the build bed surface 12. In response to at least one of the measurements, the third heat source 20 may be operated to maintain the temperature of some or preferably at least a majority of the build bed surface 12 at or near to the target layer temperature T3(target). The third heat source 20 may be feedback controlled by being operated based on temperature measurements over or within the build bed surface 12 made during step (d) at block 114 of the warm up process and at block 214 of the build process using the thermal sensor 72. These measurements may be made to capture the temperature of the entire build bed surface 12 following one or more specific steps of the layer cycle.

The third heat source 20 may be operated intermittently, but is preferably operated continuously during, or throughout, the layer cycle of the warm up process 300 and the build process 400 in response to a plurality of temperature measurements measured during step (d). Continuous operation of any of the heat sources may comprise operating a heat source at a predefined duty cycle profile over the duration of their operation. Preferably, the first and second heat source L1, L2 are operated continuously during their movement over the build bed surface 12.

The steps (b) and (c) are preferably carried out in the same way of the layer cycle 200 of a subsequent build process 400, once the warm up process 300 is complete. Where the build process only has one moveable heat source to carry out the steps (b) and (c), the same is applied during the warm up process 300. The first heat source L1 may therefore be used for carrying out step (b), returning without being operated/heating along the second direction, and then carrying out step (c). Where the apparatus has two heat separate heat sources for the two steps, for example as shown in FIGS. 1A and 1B, the two carriages may move one after the other, the second carriage 30_2 following the first carriage 30_1, along the first direction (here along x), and the first heat source L1 is used for the step (b) of heating and the second heat source L2 is used for the step (c) of heating. The order of the layer cycle described herein refers, for convenience, to operations carried out on the same layer. Other carriage arrangements may be envisaged, for example where the first and second carriage 30_1, 30_2 are reversed. In this case, the carriages move in the first direction, the second carriage 30_2 leading the first carriage 30_1, to carry out the heating step (c) of the previous layer by the second heat source L2, followed by the distributor module (or "distributor") 32 on the second carriage 30_2 to distribute the new layer at step (a) and heating that layer at step (b) using the first heat source L1. Both carriages then return along the second direction with the heat sources turned off to repeat steps (c), (a), (b). In further implementations, a single carriage may support the one or more heat sources and the distributor 32 and the deposition unit 38.

The movement of the carriages and the action of the various modules over the build bed 14 is herein described by way of a dynamic repetitive layer cycle. During the warm up process, each step represents a thermal event that has a significant effect on the temperature of the build bed surface 12. The sequence of such thermal events are being referred to herein as "thermal cycle". The layer cycle itself may comprise further steps that do not significantly affect the thermal cycle, such as depositing absorption modifier during a build process. On the other hand, the passing of the deposition module over each layer during the layer cycle may represent a significant thermal event due to the thermal mass of the deposition module. Therefore, where a deposition module is independently moveable over the layer surface, and is operated in a separate movement during the build cycle, the thermal cycle of the warm up process may comprise the step of moving the deposition module over the build bed surface 12 in the same way as during the layer cycle of the build process but without operating it. This is illustrated in FIGS. 3A-3E by the schematic representation of the various modules, comprising two heat sources L1, L2, in different positions over the build bed surface 12 during the movement along the first direction. In FIGS. 3A-3E, the distributor 32 leads the other modules and distributes a fresh layer over the build area, forming a new build bed surface 12 during its traverse. This illustrates step (a) at block 104. The first heat source L1 follows the distributor 32 and heats the newly distributed layer, illustrating the step (b) at block 106. The first heat source L1 is operated for the duration of its traverse over the build bed surface 12. Next, the deposition module 38 and the second heat source L2 follow. The deposition module 38 is not operated during its traverse. The second heat source L2 is operated for the duration of its traverse as seen in FIGS. 3D to 3E. Once the deposition module 38 and the second heat source L2 have reached the end of their traverse, all modules return along the second direction to start the layer cycle again. Thus, during the warm up process 300, a substantially, or predominantly, consistent thermal cycle is applied for each layer.

Figure 4:
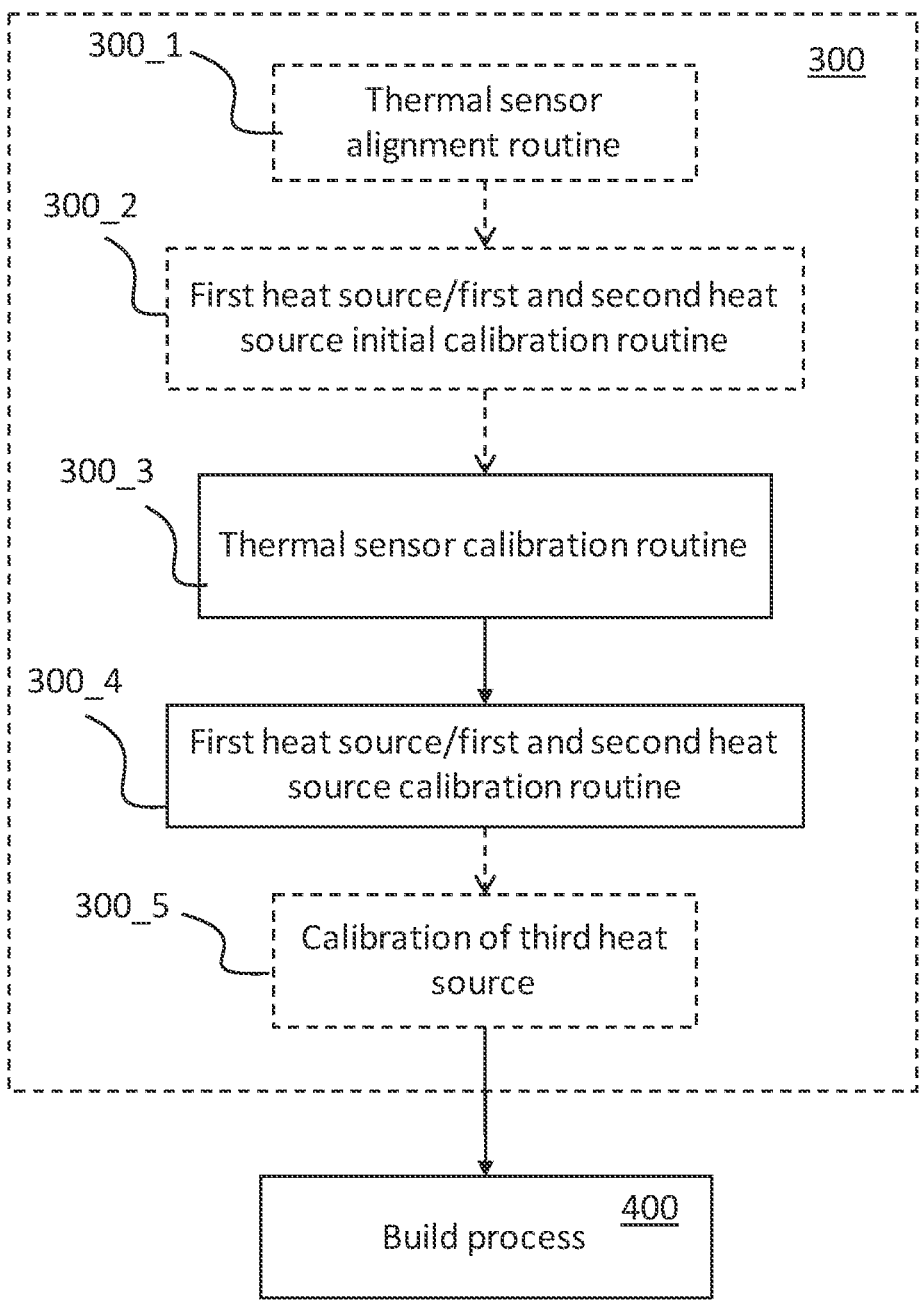
FIG. 4 is a flow chart illustrating several calibration routines within the warm up process.

In order to adequately control the heating devices that are operated during the layer cycle to control the temperature of each layer, it is desirable to carry out a calibration process of one or more calibration routines before a build process is carried out. For example, for the overhead heater 20 to be adequately feedback controlled, it is desirable that the thermal sensor 72 is calibrated with respect to a thermal characteristic of the particulate material, such as the melting point of the particulate material. In such a process the layer-specific region 50 for each layer is processed according to a layer cycle specific to a calibration routine for the thermal sensor 72. Similarly, it may be desirable to calibrate the one or more heat sources such as the first and/or second heat source L1, L2 before starting an object build process. It has been found that known calibration routines for such thermal components do not provide adequate calibration outcomes that ensure the required mechanical and aesthetic qualities of an object. Instead, it is desirable to provide such calibration routines in a manner that does not require the routine to depart from the thermal cycle of the warm up process. The warm up process may therefore comprise one or more certain calibration routines for one or more thermal control components of the apparatus that are configured to contribute to control the temperature of the build bed surface. The thermal control component may be one or more of the thermal sensor 72, the first heat source L1, the second heat source L2, and the stationary heat source 20. With reference to FIG. 4, which is a flowchart of an example sequence of calibration routines as part of the warm up process 300 followed by a build process 400, the calibration routine may be a corresponding one or more of (i) an alignment correction routine 300_1 for the measurement position of the thermal sensor, wherein the thermal sensor comprises an array of a plurality of individually controllable pixels to be aligned with the build bed surface; (ii) a distortion correction for the measurement position and/or scale of the thermal sensor, wherein the thermal sensor 72 comprises an array of a plurality of individually controllable pixels to be aligned with the build bed surface 12 (not shown but may be part of the alignment routine 300_1); (iii) a thermal calibration routine 300_3 for the measurement scale of the thermal sensor 72; (iv) an initial and/or final calibration routine 300_2, 300_4 for the input power profile of the first heat source L1, or the first and second heat source L1, L2; and (v) a calibration routine 300_5 for the input power profile(s) of the further heat source, e.g. the third heat source 20, such as to calibrate the power input to each individual heater element with respect to the other heater elements and/or with respect to a maximum threshold. FIG. 4 further illustrates, as an example, five calibration routines in the following order: first an alignment routine (and/or distortion correction routine) 300_1 for the thermal images by the thermal sensor 72 with respect to the build bed surface 12; a calibration routine 300_2 for the one or more heat sources L1, L2, for example with respect to one another, where the performance of the one or more heat sources is uncalibrated or dissimilar; a thermal sensor calibration routine 300_3 to calibrate the measurement scale of the thermal sensor 72; a calibration routine 300_4 for the one or more heat sources L1, L2, for example with respect to the calibrated thermal sensor 72; and a last calibration routine 300_5 for the power input(s) to third heat source 20. Thus one or more calibration routines may be carried out over one or more subsets of layers of the plurality of layers, wherein the calibration routine may comprise the layer cycle steps of the warm up process 300, further comprising, between the steps (b) and (c) of heating, the step of (b2) depositing an amount of one or both of absorption modifier in the form of radiation absorber over one or more layer-specific regions, and an amount of absorption modifier in the form of absorption inhibitor over a surrounding area surrounding the one or more layer-specific regions 50, and wherein for each layer of the one or more subsets, the step (c) of heating causes the layer-specific region to heat up more, to a higher temperature, than the surrounding area. Following each subset, the method further comprises determining a calibration outcome for the thermal control component; and applying the calibration outcome to the thermal control component for the remaining layers of the plurality of layers of the warm up process 300 and build process 400. The calibration routine may require at step (c) that heating causes the particulate material to melt over certain or all layer specific regions, or areas within the layer specific region (for example depending on the amount of absorber deposited in certain areas), and may thus result in one or more calibration parts comprising consolidated build material. When the same thermal cycle of the warm up process 300 is applied to a calibration routine, the calibration routine continues the thermal cycle of the warm up process 300 without interrupting it. Interrupting the thermal cycle is undesirable since it may prolong the warm up process. In addition, the inventor has found that, surprisingly, the reliability of the calibration outcome may be significantly improved by applying the thermal cycle 100 of the warm up process 300 to the calibration routine. Preferably a subsequent build process 400 uses substantially the same thermal cycle 100 as that of the warm up process 300.

Known calibration processes may vary thermal events of the layer cycle from layer to layer, for example, by repeatedly heating the same layer with the same heat source, scanning back and forth; using multiple heat sources one by one over a number of layers while in the subsequent build process they are used in combination over each layer, or by applying a static heating process in which a heat source that would normally travel back and forth across the build bed surface 12 is instead positioned in a static position to apply heat. Another calibration process may apply a very different layer cycle to that of a build process, such as uni-directional heating in a calibration routine and bi-directional heating in a subsequent build process. It is thought that this departure from the thermal cycle of the warm up routine leads to isolated conditions during the calibration routine that do not directly correlate to the build process. By the method disclosed herein, all necessary thermal calibration routines are part of the warm up process and its thermal cycle. This is found to minimise the duration of the warm up process, and in addition provides improved calibration outcomes to the conditions of the subsequent build process where such a process preferably has the same thermal cycle as the warm up process. Thus, object quality may be improved and reproduced with improved reliability build after build and between different apparatus, when the apparatus processes the same particulate material and is calibrated in the same way during the warm up process.

Figure 5:
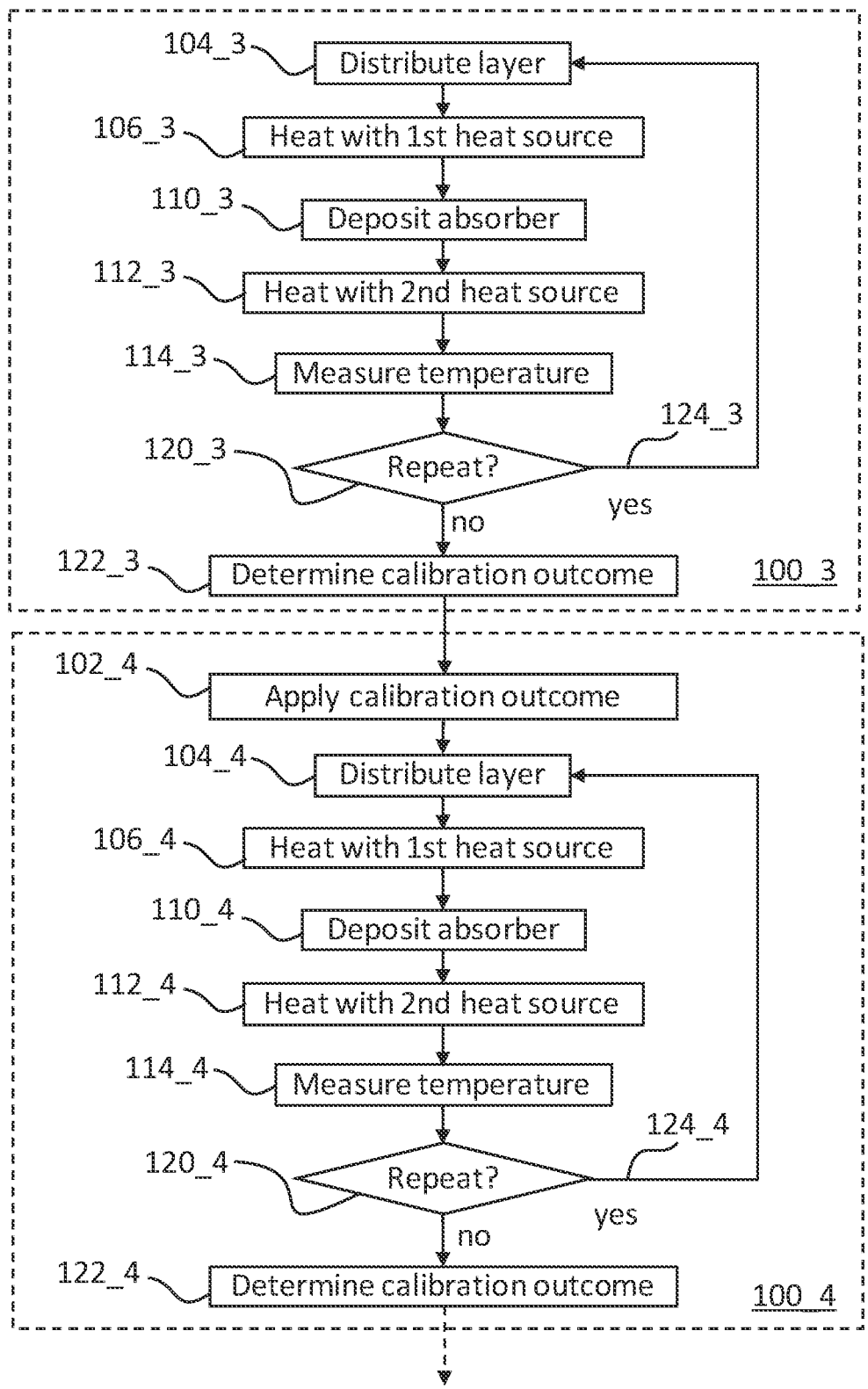
FIG. 5 is a flow chart illustrating two calibration routines comprising the layer cycle of the warm up process.

The different calibration routines and how they may be designed to fit within the thermal cycle of the warm up process will now be described with further reference to FIGS. 5 and 6.

Calibration Routine for Thermal Sensor

One such calibration routine 300_3 may be for the thermal sensor 72 to ensure that its temperature scale is calibrated, for example with respect to the melting point of the particulate material. With reference to FIG. 5, which is a flow chart illustrating the steps of two of the calibration routines, having layer cycles 100_3 and 100_4 respectively, the calibration routine and its variants will now be described in detail. For simplicity, the operation of the third heat source 20 is not shown, but equally applies to each calibration routine throughout the warm up process. Each calibration routine applies substantially the same thermal cycle 100 as that of the warm up process 300, indicated by the same numerals of the respective layer cycles. The calibration routine 300_3 for the thermal sensor 72 may be carried out over a subset of the plurality of layers of the warm up process 300 and may comprises the layer cycle steps 100_3, which are the layer cycle steps 100 of the warm up process at blocks 104_3, 106_3, 112_3 and 114_3. Furthermore, as indicated as optional in the warm up layer cycle at block 110 in FIG. 2, for the calibration process, a block 110_3 between the steps ((b) and (c) of heating provides a step of (b2) depositing absorption modifier in the form of radiation absorber over a first layer-specific region 50 arranged over the build bed surface 12. Additionally, or instead, absorption modifier in the form of absorption inhibitor may be deposited over a surrounding area surrounding the first layer-specific regions 50. In FIG. 5, the use of radiation absorber is illustrated, however the skilled person would readily be able to adapt the variants disclosed herein with respect to absorption inhibitor, or a combination of radiation absorber and absorption inhibitor. The first layer-specific region 50 may comprises a plurality of areas 500 as will be explained below.

For each layer of the subset of layers of the calibration routine 300_3, the step (c) of heating (with the first heat source L1, or, where a second heat source L2 is used, with the second heat source L2) causes a higher temperature of the first layer-specific regions 50 compared to the layer-specific regions 50 of the preceding layer (and that of the surrounding area surrounding the first layer-specific regions 50), wherein at least one of the higher temperatures causes the particulate material within the first layer-specific region 50 to start to melt, or sinter. Furthermore, the step (d) comprises measuring the temperature of the first layer-specific region 50 after the step (c) of heating, using the thermal sensor 72. Steps (a) to (d) are repeated along repeat loop 124_3 at least until the particulate material of the layer-specific regions 50 starts to melt. To ensure that melting occurs during the calibration routine, the layer-specific region may be monitored with an optical sensor. Alternatively, a fixed number of layers of the subset of layers may be predetermined and tracked at decision point 120_3 over which melting is known to occur. Achieving a progressively higher temperature of the first layer-specific region 50 may be achieved by the method comprising, at step (b2) of block 110_3, depositing a further amount of absorption modifier over the first layer-specific region 50, which in the case of radiation absorber may for example be a higher number of droplets of fluid comprising the radiation absorber deposited per unit area, compared to the previous layer specific region, wherein the further amount of absorption modifier causes the particulate material of the layer-specific region 50 to absorb more energy during the step (c) at block 112_3 of heating than the layer-specific region 50 of the preceding layer. It may have been empirically predetermined, from previous tests, that a certain number, or between certain numbers, of droplets deposited per unit area over the layer-specific region, melting is achieved within the layer-specific region at step (c). At block 122_3, from the layer-by-layer evolution of the measured temperatures of each of the layer-specific regions 50, a characteristic may be determined that is related to the onset of melting or sintering, and a calibrated measurement scale for the thermal sensor 72 may be determined based on the characteristic. The calibrated measurement scale is applied during step (d) at block 102_4 of the layer cycle 100_4 for the remaining layers of the plurality of layers of the warm up process, such that subsequent temperature measurements are calibrated temperature measurements, and such that the third heat source 20 is operated based on calibrated temperature measurements. In FIG. 5, the remaining layers of the layer cycle 100_4 comprise a further calibration routine, such that the calibration outcome of the calibration routine for the thermal sensor 72 is applied to the subsequent further calibration routine. Where the absorption modifier is radiation absorber, for each layer of the subset of layers, the higher temperature of the first layer specific region 50 at step (c) is preferably caused by depositing at step (b2) of block 110_3 a different radiation absorber and/or a larger amount per unit area of radiation absorber over the first layer-specific region 50 of each layer compared to the preceding layer, wherein the subset of layers is such that for at least one of the layers, the different radiation absorber and/or a larger amount per unit area of radiation absorber is sufficient to cause the particulate material within the layer specific region to start to melt.

The thermal sensor 72 may comprise an array of pixel sensors, and the warm up process 300 may further comprise an alignment routine 300_1 for aligning the pixel array to the build bed surface 12 and carried out over a further subset of the plurality of layers of the warm up process 300. The alignment routine 300_1 comprises the layer cycle steps 100 of the warm up process, further comprising, between the steps (b) and (c) of heating, the step of: (b2) depositing absorption modifier in the form of radiation absorber over a plurality of areas 500_n comprised within the layer-specific region 50 of the build bed surface 12; and/or depositing absorption modifier in the form of absorption inhibitor over a surrounding area surrounding the plurality of areas 500_n. Such areas are illustrated in FIG. 6 (areas 500a-500g in this example illustration). Furthermore, the step (d) of the layer cycle of the alignment routine 300_1 comprises measuring the temperature of the build bed surface 12 after the step (c) of heating. This may comprise detecting the position of the areas 500_n and comparing them to an expected position based on the bitmap that is used to control the deposition of the absorption modifier. Furthermore, a calibration outcome in the form of an alignment correction and/or a distortion correction is determined for each pixel, based on the measured temperatures by the thermal sensor 72. The alignment correction and/or a distortion correction is applied to the position of the thermal image pixels for subsequent measurements by the thermal sensor at step (d) for the remaining layers of the plurality of layers of the warm up process 300.

Figure 6:
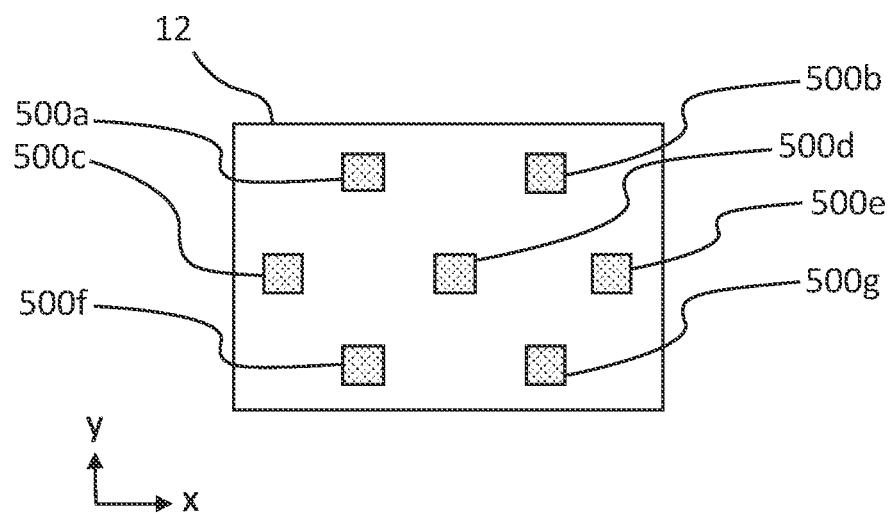
FIG. 6 is a schematic plan view of the build bed surface for a calibration routine.
Figure 7:
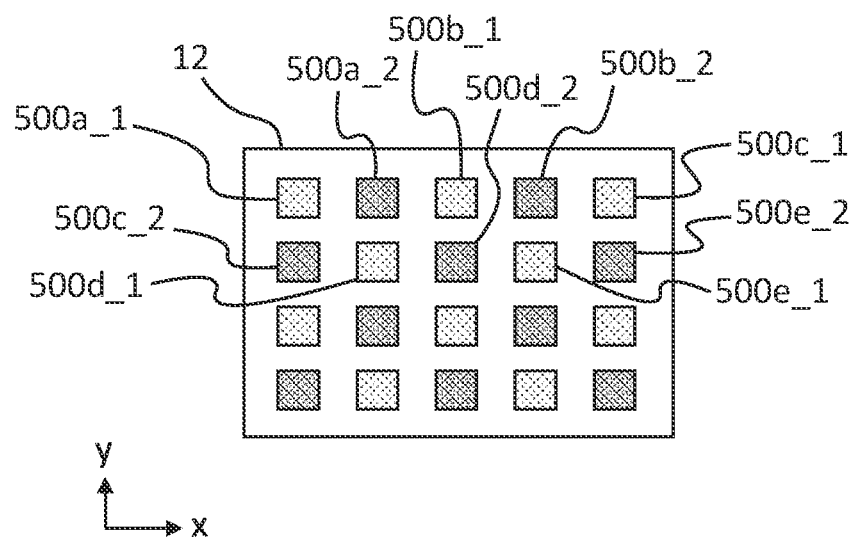
FIG. 7 is a variant of FIG. 6.

The calibration routine 300_3 for the thermal sensor 72 may, at step (b2) of block 100_3 comprise the first layer-specific region 50 to include a plurality of first areas 500_n arranged over the build bed surface 12, as shown in FIG. 6. The arrangement of the first areas 500_n may be different to the (second) areas defined within the first layer-specific region 50 for the alignment process 300_1 of the thermal sensor. Where the thermal sensor comprises a plurality of sensor pixels, step (d) may comprise measuring the temperature within each first area 500 with a corresponding one or more pixels of the plurality of sensor pixels. At block 122_3, the calibrated measurement scale for the thermal sensor may then be based on an average set point determined from each set point determined for each first area 500.

Alternatively, the calibrated measurement scale may be a per-pixel calibrated measurement scale, determined for each of the plurality of sensor pixels based on the measured temperature for each first area 500 of each layer of the calibration routine 300_3.

Calibration Routines for Moveable Heat Sources

An example of a calibration routine may be a further (second) calibration routine 300_4 (see FIG. 4) for the input power for the first heat source L1 (or where a second heat source is used in step (c), for the first and second heat sources L1, L2), and during which a layer cycle 100_4 (see FIG. 5) comprises the same thermal cycle of the warm up process. The thermal control component may thus be the first heat source, or the first and the second heat source, and wherein the calibration outcome is one or more of a calibrated first and second input power profile for respective steps (b) and (c) of heating; and wherein the first and second calibrated input power profiles are applied to respective steps (b) and (c) of the layer cycle of the remaining layers of the plurality of layers. Such a second calibration routine 300_4 may be carried out over a further subset of the plurality of layers of the warm up process 300. In addition, the layer cycle 100_4 further comprises, at block 110_4, between the steps (b) and (c) of heating, the step of (b2) depositing absorption modifier in the form of radiation absorber over one or more second layer-specific regions 50_n; and/or depositing absorption modifier in the form of absorption inhibitor over a surrounding area surrounding the one or more second layer-specific regions 50_n. The layer cycle proceeds along blocks 114_4 and 120_4 as for the warm up process and for a further number of layers along repeat loop 124_4 until the further subset of layers is complete as determined by decision point 120_4. For each layer of the further subset of layers, the steps (b) and (c) of heating at respective blocks 106_4 and 112_4 are carried out at a respective pair of first and second input power profiles P1, P2, wherein each said pair is different to the preceding pairs of the further subset of layers. At block 114_4, a first temperature T1 of the second layer-specific regions 50_n is measured after the step at block 106_4 of heating with the first heat source L1 and a second temperature T2 after the step at block 112_4 of heating (here shown for example with the second heat source L2). At block 122_4, based on the measured first and second temperatures T1, T2 of each layer of the further subset, and based on a first target temperature for the step of heating at block 106_4 and a second target temperature for the step of heating at block 112_4, at least one of a first and second calibrated input power profile are determined for the first heat source L1 during respective steps (b) and (c) of heating; or, where the second heat source L2 is used, for the respective first and second heat source L1, L2. The at least one of the first and second calibrated input power profiles is applied during respective steps (b) and (c) of the layer cycle of the remaining layers of the plurality of layers.

In some apparatus, the first and second heat source L1, L2 may be the same, single heat source operated in different 'modes', i.e. a preheat mode and a fuse mode. This might require that the same heat source is calibrated against two different modes of operation, represented by very different duty cycles, at blocks 106 and 112. For example, the three pairs of power inputs may span input powers, e.g. in duty cycle, for which preheat and fuse modes may be achieved. For example a fuse mode may be achieved by operating, at block 112, the first heat source L1 (or the second heat source L2) at a high input power, such as 100% duty cycle, and a preheat mode may be achieved by operating the first heat source L1 at a medium or low input power, such as 70%-50% duty cycle during a step 206 in a subsequent build process 400, with reference to FIG. 2. The pairs of power inputs may for example be arranged with input power levels (high, high), (medium, high), (low, medium). These power inputs provide three different pairs of input powers (P1, P2).

The two calibration routines 300_3, 300_4 may be run sequentially or in parallel. For example, the subset of layers of the calibration routine 300_3 of the thermal sensor 72 may be processed before the further subset of layers of the further calibration routine 300_4, wherein the calibration outcome to the thermal sensor is applied during processing of the second subset of layers so that the at least one of the first and second calibrated input power profiles is determined based on the calibrated temperature measurements of the thermal sensor 72 made during step (d) of the layer cycle of the further calibration routine 300_4. Furthermore, the third heat source 20 is operated in response to the calibrated temperature measurements for the further calibration routine 300_4.

Alternatively, the subset of layers may be processed after the further subset of layers, such that the calibration routine 300_3 for the thermal sensor is carried out after the further calibration routine 300_4, wherein the at least one of the first and second calibrated input power profiles is applied during respective steps (b) and (c) of the layer cycle of the calibration routine 300_3.

In a further example, the subset of layers and the further subset of layers may be comprised within a combined (common) subset of layers, such that the calibration routine 300_3 for the thermal sensor is carried out over at least some of the same layers as the further calibration routine 300_4. The at least one of the first and second calibrated input power profiles and the calibrated measurement scale of the thermal sensor 72 are determined after the combined subset of layers has been processed, wherein the at least one of the first and second calibrated input power profiles are determined based on the measured temperatures of the one or more layer-specific regions and based on the calibration outcome for the thermal sensor, and are applied during the layer cycle of the remaining layers of the warm up process 300. For example, with reference to FIG. 7, at step (b2) for the calibration routine for the thermal sensor, a plurality of first areas of the first layer-specific region 500a_1, 500b_1, 500c_1 . . . may be defined by the absorption modifier. Within at least some of the same layers of the subset of layers, at respective step (b2) for the calibration routine for the first heat source, or the first and second heat source, a plurality of second layer-specific regions 500a_2, 500b_2, 500c_2 . . . may be defined by the absorption modifier. These second layer-specific regions 500a_2, 500b_2, 500c_2 are shaded slightly darker compared to the first areas 500a_1, 500b_1, 500c_1 . . . of the first layer-specific region in FIG. 7. Generally therefore, the method may comprise between steps (b) and (c) of heating, the step (b2) of depositing an amount of absorption modifier in the form of radiation absorber over one or more layer-specific regions; and/or depositing an amount of absorption modifier in the form of absorption inhibitor over a surrounding area surrounding the one or more layer-specific regions; wherein for each layer of the subset, the step (c) of heating causes a higher temperature of the layer-specific region compared to the surrounding region; wherein the method further comprises: processing a first subset of layers of the plurality of layers for the calibration routine for the thermal sensor 72; determining a calibration outcome for the thermal sensor based on the measurements during step (d) of the first subset of layers, so as to calibrate the temperature scale of the thermal measurements of the thermal sensor 72; applying the calibration outcome to the thermal sensor, wherein the calibration outcome is a calibrated measurement scale for the thermal sensor 72; processing a second subset of layers of the plurality of layers for the calibration routine for the first heat source L1, or for the first and second heat source L1, L2; determining a calibration outcome for the first heat source, or for the first and second heat source, wherein the calibration outcome is at least one of a first and second calibrated input power profile for respective steps (b) and (c) of heating; applying the at least one of the first and second calibrated input power profiles to respective steps (b) and (c) of the layer cycle of the remaining layers of the plurality of layers; and wherein the method comprises one of either: processing the first subset before the second subset, such that the second subset is processed using the calibrated temperature scale of the thermal sensor at step (d); or—processing the first and second subset as a common subset of layers, wherein the calibration outcome for the thermal sensor 72 and for the first heat source L1, or for the first heat source and second heat source L1, L2, are determined following completion of the common subset of layers and applied to the remaining layers of the plurality of layers of the warm up process 300 and to the plurality of layers of the build process 400.

In some apparatus, it may be desirable to carry out a relative calibration routine 300_2 to calibrate a single heat source against two modes of operation during respective steps (b) and (c), or to calibrate one of the first and second heat source L1, L2 against the other, for example before the calibration routine 300_3 for the thermal sensor 72. The relative calibration is carried out over a third subset of the plurality of layers of the warm up process and comprises the layer cycle steps of the warm up process, the layer cycle further comprising, between the steps (b) and (c) of heating, the step (b2) of depositing absorption modifier in the form of radiation absorber over one or more third layer-specific regions 50; and/or depositing absorption modifier in the form of absorption inhibitor over a surrounding area surrounding the one or more third layer-specific regions 50. For each layer of the third subset of layers, the steps (b) and (c) of heating are carried out at a respective pair of first and second input power profiles P1, P2, wherein each said pair is different to the preceding pairs of the further subset of layers.

At a respective block 114 of the relative calibration routine 300_2 (see FIG. 2), a first temperature T1 is measured after the step of heating at block 106 and a second temperature T2 after the step of heating at block 112 of the one or more third layer-specific regions, and furthermore a third temperature T3 of the surrounding area is measured after the step (c) of heating at block 112. Based on the measured first, second and third temperatures T1, T2, T3 for each layer of the third subset, at least one of a first and second calibrated input power profile is determined for the first heat source L1 during respective steps (b) and (c) of heating; or, where the second heat source L2 is used, for the respective first and second heat source L1, L2 so as to calibrate the performance of the heat source(s) at the step of heating at block 106 with respect to the step of heating at block 112; and the at least one of the first and second calibrated input power profiles is applied to respective steps (b) and (c) of the layer cycle of the calibration routine 300_3 for the thermal sensor 72.

Two different heating effects may be provided within the third layer specific region, such that there is a first subregion and a second subregion within the third layer specific region. At block 110, a first amount of absorption modifier is deposited over the first subregion and a second amount is deposited over the second subregion, wherein the second amount of radiation absorber causes less energy to be absorbed during the step (c) of heating than the amount deposited over the first subregion 50_1; and such that the third temperature T3 is between the second temperature T2 and a temperature of the surrounding area surrounding the first and second subregions 50_1, 50_2. When the absorption modifier is radiation absorber for example, the first amount may be higher than the second amount of radiation absorber. In this way, the input power profiles of the heat sources L1, L2 may be calibrated relative to one another.

The considerations as described above apply to a single heat source compared to a first and second heat source L1, L2 used to provide the steps of heating at blocks 106 and 112 for either of the calibration routines for the one or more heat sources 300_2, 300_4. More than two moveable heat sources may be provided in other variants of the apparatus, such as a further second heat source L2_2 following the second heat source L2. The two heat sources may be treated as a single heat source operated at additional pairs of power inputs, such that for each layer, the heat sources are operated at respective sets of three power inputs (P1, P2, P3) per layer: the first heat source L1, during the step of heating the first subregion 50_1, is operated at power P1 as before, and the second and further second heat sources L2, L2_2 are operated during the step of heating the first and second subregions 50_1 50_2 at respective power inputs P2, P3.

Similarly, where the further heat source is a further first heat source, for each layer the heat sources are operated at respective sets of three power inputs (P1, P2, P3) per layer such that the first heat source L1 and further first heat source L1_2 are operated at powers P1 and P3 during the step of heating the first subregion 50_1, and the second heat source L2 is operated at power input P2 during the step of heating the first and second subregions 50_1 50_2. The steps of measuring the first, second and third temperature remain the same. The first, second and third temperatures measured according to the methods disclosed herein thus allow the determination of an adjustment for the input power to one or both (or any further) of the heat sources that takes into account the heating effect of both first and second (and optionally further) heat sources within the same layer.

Regarding the relative calibration routine 300_2 and/or the further calibration routine 300_4 for the one or more heat sources L1, L2, a first target temperature T1(target) may be provided for the layer-specific region 50 or the first subregion 50_1 of the respective routine following the step of heating with the first heat source at block 106, and a second target temperature T2(target) may be provided for the layer-specific region 50 or the first subregion 50_1 of the respective routine following the step of heating with the first or second heat source at block 112. The determination step further comprises determining the at least one of the calibrated first input power profile and second input power profile based on the first target temperature T1(target) and the second target temperature T2(target), such that the at least one of the calibrated first and/or second input power profile, when applied during a subsequent layer, causes a subsequent measured temperature of a subsequent layer-specific region measured after the step (b) at block 106 to be within a first range R1 of the first target temperature T1(target), and a subsequent measured second temperature measured after the step (c) at block 112 to be within a second range R2 of the second target temperature T2(target), such that the first and second ranges R1, R2 are smaller over those measured for any of the plurality of layers preceding the further subset of layers.

In variants, the relative calibration routine 300_2 may replace the second calibration routine 300_4 and is carried out after or at the same time as the calibration routine 300_3 for the thermal sensor 72.

Furthermore, the steps (a), (b) and (c) of the warm up process and the build process may be carried out in a first direction for each of the plurality of layers; and the step (a) of distributing each layer is preferably initiated after a first time interval from initiating the step (c) of heating of the previous layer, and the step (c) of heating each layer is preferably initiated after a second time interval from initiating the step (a) of distributing the layer; wherein the first and second time interval are the same for each layer of the plurality of layers; and further wherein the step (b) of heating each layer is preferably initiated after a third time interval from initiating the step (a) of distributing the layer, and wherein the third interval is the same for each layer of the plurality of layers. Preferably further, for at least the build process, and optionally also for at least some layers of the warm up process, the speed of moving the distributor and of moving the first and, where present, the second heat source over the build bed surface is preferably the same constant speed for each layer along the first direction. This provides for a constant thermal cycle (in terms of timings, directions and speeds of thermal events) for the warm up process and the build process, and wherein the thermal cycle preferably remains the same for at least the calibration routines of the warm up process, and preferably all layers of the warm up process, and for the build process.

Differential Heating

Differential heating between two subregions 50_1, 50_2, or over successive layers of a region 50, may be applied by altering the absorptive properties from one region to the next. This may be achieved by changing the amount of absorption modifier applied from the first to the second region by one or more of the following:
  (i) the coverage of the absorption modifier per unit area over each region 50. The second amount per unit area of absorption modifier may be different to the first amount per unit area of absorption modifier. In the case of radiation absorber, for example the amount of radiation absorber deposited per unit area over the first subregion 50_1 in the relative calibration routine 300_2 may thus be higher than that deposited over the second region 50_2. Preferably the amount deposited per unit area over the first subregion 50_1 and over the second subregion 50_2 may be such that it causes a suitable accuracy in temperature measurements. For example, a temperature difference between 5° C.-10° C. may be sufficient. This may conveniently be achieved by providing the first and second amount of absorption modifier in the form of droplets of a fluid, and depositing the first and second amount of absorption modifier with one or more droplet deposition units 38. The coverage may be defined by one or both of the print pattern determining the spacing between drops deposited (as controlled by the printed image pattern and/or by a dither scheme) and/or the volume of each drop deposited at each location on the layer-specific region 50. For the calibration routine 300_3 of the thermal sensor 72, for each further layer the amount of fluid may similarly be altered. With reference to the calibration routine 300_2, the following equally applies between the two subregions as between the region 50 of two successive layers of the calibration routine 300_3 for the thermal sensor 72 at block 110:
  depositing a different number of drops of fluid: in the case of a radiation absorbing fluid, depositing a higher number of drops per unit area over the first subregion 50_1 compared to the second subregion 50_2; in the case of inhibitor fluid, depositing a lower number of drops per unit area over the second subregion 50_2 compared to the surrounding area, where the volume per drop may be substantially constant. In this way the first subregion 50_1 absorbs a higher amount of energy from the second heat source L2 than the second subregion 50_2;
  depositing drops of fluid of a different volume (in the case of a radiation absorbing fluid, a larger volume of drops per unit area over the first subregion 50_1; and in the case of inhibitor fluid, a smaller volume of drops per unit area over the second subregion 50_2 compared to that deposited over the surrounding area).

(ii) The type of absorption modifier. Multiple absorption modifiers (e.g. radiation absorbers) may be provided to the apparatus. The first and second amount may be deposited by a respective droplet deposition head in form of respective first and second fluids, wherein the second fluid is different from the first fluid, and comprises one or both of a different absorption modifier and a different concentration per weight per volume compared to the first fluid. When in the form of radiation absorber, the first fluid causes the first subregion 50_1 to heat to a higher temperature than the second subregion 50_2 as caused by the second fluid, i.e. the measured second temperature T2 is higher than the measured third temperature T3. The first amount of absorber may be provided by a first absorber capable of absorbing a higher level of energy from the second heat source L2 compared to a second absorber deposited to form the second amount. Alternatively, when in the form of absorption inhibitor, the second fluid causes the second subregion 50_2 to heat to a higher temperature than the surrounding area surrounding the first and second regions, as caused by the first fluid, and to a lower temperature than the first subregion 50_1, i.e. again such that the measured second temperature T2 is higher than the measured third temperature T3.

The absorption modifiers may comprise different colours capable of absorbing or inhibiting a different amount of energy of the radiation spectrum of the second heat source L2. Multiple fluids provided to the apparatus may be deposited in an overlapping multi-fluid pattern to vary the absorption of the energy of the radiation provided by the second heat source L2. The radiation absorber (or absorption modifier) may be deposited in the form of a multi-fluid pattern, wherein the multi-fluid pattern is deposited over the first and second subregions 50_1 and 50_2.

Calibration of Overhead Heater

Optionally, a calibration routine 300_5 for the third heat source may be carried out during the warm up process 300. For example, the individually addressable heating (heater) elements of the third heat source, such as overhead heater 20 of FIG. 1A, may require calibrating against a maximum duty cycle threshold to reduce the likelihood of failure during the build process. For example, over a subset of layers of the plurality of layers of the warm up cycle, wherein each heating element is controlled at block 80 based on the temperature measurements during step 114 (e.g. a comparable step 114_5 comprised within a layer cycle 104_5 to 114_5 similar to that of the warm up process), the calibration routine 300_5 may comprise determining the duty cycle profile required for each heating element to achieve the target temperature T3(target) of the build bed surface 12, and assessing whether any modification to the operation of one or more of the heating elements is required to avoid being operated beyond a predefined maximum threshold. This may prolong the lifetime of the heating elements. For example, an outcome of the calibration routine 300_5 of the third heat source may be a digital weighting or a limitation of the duty cycle applied to one or more of the heating elements.

For any, any combination, or all of the calibration routines 300_1 to 300_5, each layer of the various subsets of layers of the plurality of warm up layers may further comprise a set of sublayers, wherein each sublayer is processed according to the same steps of that layer, and wherein the measured temperature at step (d) is an average temperature based on the respective temperatures measured within the respective layer-specific region (or within each of the respective plurality of areas) of one or more of the sublayers of that layer.

Furthermore, during the calibration routines, some layers may be blank layers. In other words, it is not essential that step (b2) is applied during each layer of the subset of layers, or during the further subset of layers, or the combined subset of layers.

The purpose of the warm up process is to bring the apparatus into a steady thermal state/equilibrium. This may be achieved after a predetermined number of layers, and/or based on for example reaching a steady operation of the third heat source, which is being feedback-operated based on the measured temperature of the build bed surface 12, for example in terms of a substantially non-varying duty cycle, layer by layer, of each heating element. Alternatively, the number of layers may have been predetermined, based on for example temperature measurements reflecting the thermal state of the apparatus, such as for example of the particulate material ahead of being distributed over the build bed. For 'blank' layers over which no radiation absorber has been deposited, the steps of heating do not cause the particulate material to melt but serve to warm the particulate material so as to achieve the steady thermal state. The step 106 may heat the layer to a temperature near to or to the target later temperature T3(target). During calibration routines, the warm up process is not interrupted by following the same thermal process as the warm up process.

Build Process

After the warm up process 300 is complete and the apparatus has reached a thermal equilibrium as required by the build process, a build process 400 for an object may be carried out over a plurality of build layers without interrupting the thermal cycle established by the warm up process, by processing each build layer over a layer cycle 200 that comprises similar or substantially the same thermal cycle steps as the warm up process. Thus the steps at blocks 104, 106, 112, and preferably of the motion of the deposition module at 110 of the warm up process 300 may at least be similar to, or be substantially the same as, corresponding layer cycle steps of the build process 400, as indicated in FIGS. 2 and 8 by the numbering being advanced from 100 to 200 (e.g. 104 to 204, etc.). The layer cycle of the build process 400 further comprises, between the steps (b) and (c) of heating, the step at block 210 of: (b2) depositing absorption modifier in the form of radiation absorber over one or more layer-specific regions 50; and/or depositing absorption modifier in the form of absorption inhibitor over a surrounding area surrounding the one or more layer-specific regions 50. The calibration outcome of any, any combination, or all of calibration routines 300_1, 300_3, 300_4 and 300_5, where present in the warm up process 300, are applied during the layer cycle of the build process. For example, the alignment and/or distortion correction and the calibrated temperature scale determined in calibration routines 300_1 and 300_3 may be applied to the temperature measurements by the thermal sensor 72 at block 214 of the build process 400. Thus, the third heat source 20 is operated in response to the calibrated temperature measurements of the thermal sensor measured during step (d) of the layer cycle.

Furthermore, the at least one of the first and second calibrated input power profiles determined at either calibration routine 300_2 or 300_4 is applied during respective steps (b) at block 206 and (c) at block 212, and such that the step (c) of heating at block 212 causes the layer-specific region 50 of the layer to melt. It will be appreciated that in a typical build process, not every layer will have a layer-specific region 50.

During the layer cycle of the build process, and during at least one of the calibration routines 300_2 and 300_4 for the one or more heat sources L1, L2, at least one of the first and second input power profiles of the pairs of profiles may vary over the build bed surface 12 along the first direction. For example, the input power profile of the first heat source L1 during step (b) of the layer cycle may be a decreasing power profile along the first direction over the build bed surface 12.

In preferred variants of the methods of operation disclosed herein, the speed of moving the distributor 32 and of moving the first heat source L1 and, where present, the second heat source L2 over the build bed surface 12 is the same constant speed for each layer. Furthermore, preferably the step (a) of distributing each layer is initiated after a first time interval from initiating the step (c) of heating of the previous layer, and wherein the step (c) of heating each layer is initiated after a second time interval from initiating the step (a) of distributing the layer; and wherein the first and second time interval are the same for each layer of the plurality of layers. In this way, the duration of time of the layer cycle may be substantially the same for each layer. It has been found that this provides for an improved stable thermal cycle and for a more reliable build process 400 when these layer cycle conditions are applied throughout the method of operation. In this way, each location on the build bed surface 12 experiences the same layer cycle steps after the same respective time intervals and for the same respective durations, providing a stable and consistent layer cycle. Furthermore, the step (b) of heating each layer is preferably initiated after a third time interval from initiating the step (a) of distributing the layer, and preferably wherein the third interval is the same for each layer of the plurality of layers. Preferably, as explained above, these conditions when applied to the warm up process 300, comprising the various calibration routines, are the same as applied to the build process 400. This provides for a consistent stable thermal cycle throughout the method of operation of the apparatus 1. After the build process 400, a cooling process may be initiated before the built object(s) are removed from the build bed. In some variants, the cooling process may be applied within the printer, and the third heat source may be used to control the rate of cooling by being operated in response to temperature measurements of the build bed surface 12 by the thermal sensor until an average minimum temperature build bed surface has been determined.

Any parts or all of the method of operation and its variants described herein may be applied by a controller 70 comprised within the apparatus.

The invention claimed is:

1. A method of operation for an apparatus for the layer by layer manufacture of 3D objects from particulate material, the apparatus comprising a thermal sensor, a stationary heat source positioned above a build bed surface of each layer, and first and second heat sources that are moveable over the build bed surface; wherein the method comprises a warm up process followed by a build process, and each process comprises processing a plurality of layers, wherein each layer is processed by a layer cycle comprising the steps (a) to (d) of:
   (a) distributing a layer of particulate material by moving a distributor over a build area, the layer providing the build bed surface of the build area;
   (b) heating the build bed surface using the first heat source by moving the first heat source over the build bed surface while operating the first heat source;
   (c) heating the build bed surface by moving the second heat source over the build bed surface while operating the second heat source; and
   (d) measuring the temperature of the build bed surface at least once after one or more of steps (a) to (c), using the thermal sensor;
   wherein the layer cycle comprises, during one or more of steps (a) to (c), heating the build bed surface with the stationary heat source to a target layer temperature between the solidification temperature and the melting temperature of the particulate material; and
   wherein the layer cycle of the build process further comprises, between the steps (b) and (c) of heating, a step of:
   (b2) depositing absorption modifier in the form of radiation absorber over one or more layer-specific regions; and/or depositing absorption modifier in the form of absorption inhibitor over a surrounding area surrounding the one or more layer-specific regions, such that the step (c) of heating causes the layer-specific region of each build layer to melt so as to form a cross section of one or more 3D objects;
   wherein the step (a) of distributing each layer is initiated after a first time interval from initiating the step (c) of heating of the previous layer, and wherein the step (c) of heating each layer is initiated after a second time interval from initiating the step (a) of distributing the layer; and wherein the first and second time intervals are the same for each layer of the plurality of layers; and
   wherein the steps (a), (b) and (c) are carried out in a first direction for each of the plurality of layers.

2. The method of claim 1, wherein the stationary heat source is operated in response to the one or more temperature measurements measured at step (d) and based on the target layer temperature.

3. The method of claim 1, wherein the warm up process further comprises a calibration routine for a thermal control component, configured to contribute to control the temperature of the build bed surface, carried out over a subset of the plurality of layers, wherein the calibration routine comprises the layer cycle steps of the warm up process, further comprising, between the steps (b) and (c) of heating, the step of:
   (b2) depositing an amount of absorption modifier in the form of radiation absorber over one or more layer-specific regions; and/or depositing an amount of absorption modifier in the form of absorption inhibitor over a surrounding area surrounding the one or more layer-specific regions; wherein the step (c) of heating causes each layer-specific region to heat up more than the surrounding area; and, after processing of the subset of layers,
       determining a calibration outcome for the thermal control component; and
       applying the calibration outcome to the thermal control component for the remaining layers of the plurality of layers.

4. The method of claim 3, wherein the thermal control component is one or more of the thermal sensor, the first heat source, the second heat source, and the stationary heat source, wherein the calibration routine is a corresponding one or more of:
   an alignment correction for the measurement position of the thermal sensor, wherein the thermal sensor comprises an array of a plurality of individually controllable pixels to be aligned with the build bed surface;
   a distortion correction for the measurement position and/or scale of the thermal sensor, wherein the thermal sensor comprises an array of a plurality of individually controllable pixels to be aligned with the build bed surface;
a thermal calibration routine for the measurement scale of the thermal sensor;
a calibration routine for the input power profile of the first heat source;
a calibration routine for the input power profile of the second heat source; and
a calibration routine for the input power profile of the further heat source.

5. The method of claim 4, wherein the absorption modifier is radiation absorber, and wherein for each layer of the calibration routine, the higher temperature of each layer specific region at step (c) is caused by depositing at step (b2) a larger amount per unit area of radiation absorber over the layer-specific region of each layer compared to the preceding layer, such that for at least one of the layers of the calibration routine, the larger amount per unit area of radiation absorber is sufficient to cause the particulate material within the one or more layer specific region to start to melt.

6. The method of claim 3, wherein the thermal control component is the thermal sensor, and wherein
the step (b2) comprises depositing an amount of radiation absorber and wherein the amount of radiation absorber is more than that deposited over the layer-specific region of the preceding layer, such that the amount of radiation absorber causes the particulate material of each layer-specific region to absorb more energy during the step (c) of heating than the layer-specific region of the preceding layer;
the step (d) comprises measuring the temperature of the one or more layer-specific region after the step (c) of heating;
repeating steps (a) to (d) at least until the particulate material of at least one of the layer-specific regions starts to melt;
wherein, based on a characteristic in the layer by layer evolution of the measured temperatures, the calibration outcome is a calibrated temperature measurement scale for the temperature measurements generated by the thermal sensor; and
wherein the calibration outcome is applied during step (d) of the layer cycle for the remaining layers of the plurality of layers.

7. The method of claim 6, wherein the layer-specific region comprises a plurality of areas arranged over the build bed surface; wherein the thermal sensor comprises a plurality of sensor pixels, such that step (d) comprises measuring the temperature within each area using a corresponding one or more pixel of the plurality of sensor pixels, and wherein the calibrated measurement scale for the thermal sensor is
based on an average set point determined from each set point determined for each area, or
determined for each of the plurality of sensor pixels based on the measured temperature for each area of each layer.

8. The method of claim 3, wherein the thermal control component is the first and the second heat source, and wherein the calibration outcome is one or more of a calibrated first and second input power profile for the first and second heat source during respective steps (b) and (c) of heating; and wherein the first and second calibrated input power profiles are applied to respective steps (b) and (c) of the layer cycle of the remaining layers of the plurality of layers.

9. The method of claim 3, wherein the thermal control component is the thermal sensor and the first heat source and the second heat source, wherein the warm up process comprises a first calibration routine for the thermal sensor carried out over a first subset of the plurality of layers, and a second calibration routine for the first heat source and the second heat source, carried out over a second subset of the plurality of layers subsequent to the first subset, wherein each calibration routine comprises the layer cycle steps of the warm up process, further comprising, between the steps (b) and (c) of heating, the step of:
(b2) depositing an amount of absorption modifier in the form of radiation absorber over one or more layer-specific regions; and/or depositing an amount of absorption modifier in the form of absorption inhibitor over a surrounding area surrounding the one or more layer-specific regions;
wherein further for each subset, the step (c) of heating causes a higher temperature of the layer-specific region compared to that of the surrounding area;
further comprising, following the first subset:
determining a calibration outcome for the thermal sensor so as to calibrate the temperature scale of the thermal measurements of the thermal sensor;
applying the calibration outcome to the thermal sensor for the second subset;
and following processing the second subset:
determining, based on the measured temperatures of the one or more second layer-specific regions of the second subset, at least one of a first and second calibrated input power profile for the steps (b) and (c) of heating; and
applying the at least one of the first and second calibrated input power profiles to respective steps (b) and (c) of the layer cycle of the remaining layers.

10. The method of claim 3, wherein the step (c) of heating causes the particulate material of the layer-specific region to melt for one or more layers of each the first and second set of sublayers.

11. The method of claim 3, wherein the warm up process further comprises a first calibration routine for the thermal sensor and a second calibration routine for the first heat source, or for the first and second heat source, carried out over a common subset of the plurality of layers subsequent to the first subset, wherein the common subset is processed according to the layer cycle steps of the warm up process, further comprising, between the steps (b) and (c) of heating, the step of:
(b2) depositing an amount of absorption modifier in the form of radiation absorber over one or more layer-specific regions; and/or depositing an amount of absorption modifier in the form of absorption inhibitor over a surrounding area surrounding the one or more layer-specific regions; further wherein for each layer of the subset, the step (c) of heating causes a higher temperature of the layer-specific region compared to that of the surrounding area;
further comprising:
determining a calibration outcome for the thermal sensor so as to calibrate the temperature scale of the thermal measurements of the thermal sensor, and
determining, based on the measured temperatures of the one or more layer-specific regions and based on the calibration outcome for the thermal sensor, at least one of a first and second calibrated input power profile for respective steps (b) and (c) of heating; and applying the calibration outcome for the thermal sensor and the at least one of the first and second calibrated input power profiles to respective steps (b) and (c) of the layer cycle of the remaining layers of the plurality of layers.

12. The method of claim 3, wherein each layer of the calibration routine comprises a set of sublayers, wherein each sublayer is processed according to the same steps of that layer, and wherein the measured temperature at step (d) is an average temperature based on the respective temperatures measured within the layer-specific region of one or more of the sublayers of that layer.

13. The method of claim 1, wherein the step (b) of heating each layer is initiated after a third time interval from initiating the step (a) of distributing the layer, and wherein the third interval is the same for each layer of the plurality of layers.

14. The method of claim 1, wherein the speed of moving the distributor and of moving the first heat source and the second heat source over the build bed surface is the same constant speed for each layer.

15. The method of claim 1, wherein the stationary heat source comprises an array of individually operable heater elements positioned above the build bed surface, and wherein the thermal sensor comprises an array of individual sensor pixels, wherein measuring the temperature at step (d) of the layer cycle comprises:

determining a zonal temperature for each of a plurality of zones of the build bed surface as measured by a subset of the sensor pixels; and determining a zonal temperature difference between each zonal temperature and the target layer temperature;

wherein the step of heating each layer by the stationary heat source comprises heating each zone by operating one or more corresponding heater elements of the array of individually operable heating elements in response to the determined zonal temperature difference.

16. A method of operation for an apparatus for the layer by layer manufacture of 3D objects from particulate material, the apparatus comprising a thermal sensor, a stationary heat source positioned above a build bed surface of each layer, and first and second heat sources that are moveable over the build bed surface; wherein the method comprises a warm up process followed by a build process, and each process comprises processing a plurality of layers, wherein each layer is processed by a layer cycle comprising the steps (a) to (d) of:

(a) distributing a layer of particulate material by moving a distributor over a build area, the layer providing the build bed surface of the build area;

(b) heating the build bed surface using the first heat source by moving the first heat source over the build bed surface while operating the first heat source;

(c) heating the build bed surface by moving the second heat source over the build bed surface while operating the second heat source; and (d) measuring the temperature of the build bed surface at least once after one or more of steps (a) to (c), using the thermal sensor;

wherein the layer cycle comprises, during one or more of steps (a) to (c), heating the build bed surface with the stationary heat source to a target layer temperature between the solidification temperature and the melting temperature of the particulate material; and wherein the layer cycle of the build process further comprises, between the steps (b) and (c) of heating, a step of:

(b2) depositing absorption modifier in the form of radiation absorber over one or more layer-specific regions; and/or depositing absorption modifier in the form of absorption inhibitor over a surrounding area surrounding the one or more layer-specific regions, such that the step (c) of heating causes the layer-specific region of each build layer to melt so as to form a cross section of one or more 3D objects; and wherein the steps (a), (b) and (c) of the warm up process and the build process are carried out in a first direction for each of the plurality of layers, wherein for at least the build process, the speed of moving the distributor and of moving the first heat source and the second heat source over the build bed surface is the same constant speed for each layer along the first direction; and wherein the step (a) of distributing each layer is initiated after a first time interval from initiating the step (c) of heating of the previous layer, and wherein the step (c) of heating each layer is initiated after a second time interval from initiating the step (a) of distributing the layer; and wherein the first and second time interval are the same for each layer of the plurality of layers; and wherein the step (b) of heating each layer is initiated after a third time interval from initiating the step (a) of distributing the layer, and wherein the third interval is the same for each layer of the plurality of layers.

17. A method of operation for an apparatus for the layer by layer manufacture of 3D objects from particulate material, the apparatus comprising a thermal sensor, a stationary heat source positioned above a build bed surface of each layer, and first and second heat sources that are moveable over the build bed surface; wherein the method comprises a warm up process followed by a build process, and each process comprises processing a plurality of layers, wherein each layer is processed by a layer cycle comprising the steps (a) to (d) of:

(a) distributing a layer of particulate material by moving a distributor over a build area, the layer providing the build bed surface of the build area;

(b) heating the build bed surface using the first heat source by moving the first heat source over the build bed surface while operating the first heat source;

(c) heating the build bed surface by moving the second heat source over the build bed surface while operating the second heat source; and (d) measuring the temperature of the build bed surface at least once after one or more of steps (a) to (c), using the thermal sensor;

wherein the layer cycle comprises, during one or more of steps (a) to (c), heating the build bed surface with the stationary heat source to a target layer temperature between the solidification temperature and the melting temperature of the particulate material; and wherein the layer cycle of the build process further comprises, between the steps (b) and (c) of heating, a step of:

(b2) depositing absorption modifier in the form of radiation absorber over one or more layer-specific regions; and/or depositing absorption modifier in the form of absorption inhibitor over a surrounding area surrounding the one or more layer-specific regions, such that the step (c) of heating causes the layer-specific region of each build layer to melt so as to form a cross section of one or more 3D objects; and wherein for both the warm up process and the build process:
  the steps (a), (b) and (c) are carried out in a first direction for each of the plurality of layers;
  the step (a) of distributing each layer is initiated after a first time interval from initiating the step (c) of heating of the previous layer;
  the step (c) of heating each layer is initiated after a second time interval from initiating the step (a) of distributing the layer; and
  the step (b) of heating each layer is initiated after a third time interval from initiating the step (a) of distributing the layer;
wherein the respective first, second and third time intervals are the same for each layer of the plurality of layers of the warm up process and the build process.

18. The method of claim 1, wherein the stationary heat source is operated continuously throughout the layer cycle and wherein the step (b) of heating the build bed surface is carried out by the first heat source so as to preheat the build bed surface to a preheat temperature between the solidification temperature and the melting temperature of the particulate material.

* * * * *